(12) United States Patent
Maldonado-Cortés

(10) Patent No.: US 6,331,685 B1
(45) Date of Patent: Dec. 18, 2001

(54) MOUNTING SYSTEM FOR A CIRCUIT BREAKER

(75) Inventor: Demófilo Maldonado-Cortés, Nuevo León (MX)

(73) Assignee: Prolec GE, S. de R.L. de C.V., Apodaca (MX)

( * ) Notice: Subject to any disclaimer, the term of this patent is extended or adjusted under 35 U.S.C. 154(b) by 0 days.

(21) Appl. No.: 09/691,618

(22) Filed: Oct. 18, 2000

(51) Int. Cl.⁷ ...................................................... H01H 3/00
(52) U.S. Cl. ...................... 200/17 R; 200/401; 200/337; 218/89
(58) Field of Search .................. 218/89, 91, 92; 200/400, 401, 17 R, 500, 501, 330, 331, 337

(56) References Cited

U.S. PATENT DOCUMENTS

| | | | |
|---|---|---|---|
| 3,789,172 | * | 1/1974 | Cole et al. ...................... 200/153 SC |
| 3,944,772 | * | 3/1976 | Davies ........................... 200/153 SC |
| 4,002,864 | * | 1/1977 | Kuhn et al. ....................... 200/50 AA |
| 4,297,663 | * | 10/1981 | Seymour et al. ........................ 335/20 |
| 4,612,424 | * | 9/1986 | Clak et al. ........................... 200/50 A |
| 4,885,444 | * | 12/1989 | Lazar et al. ........................... 200/401 |
| 5,192,941 | * | 3/1993 | Fishovitz et al. ...................... 340/638 |
| 5,286,935 | * | 2/1994 | Mina et al. ............................ 200/330 |
| 5,475,570 | * | 12/1995 | Harr ..................................... 361/825 |
| 5,821,487 | * | 10/1998 | Groves et al. ..................... 200/50.02 |
| 5,902,973 | * | 5/1999 | Ramey et al. ..................... 200/50.01 |

* cited by examiner

Primary Examiner—Lincoln Donovan
Assistant Examiner—Kyung S. Lee
(74) Attorney, Agent, or Firm—Abelman, Frayne & Schwab

(57) ABSTRACT

A mounting system for a circuit breaker comprising: a mounting box; an angular mounting plate, including a planar portion retained to a mounting wall of a mounting box, and an angular portion at about 200° in which a circuit breaker body is retained; a mechanical breaker actuator handle, retained to the mounting wall, including an actuator bar coupled to the breaker actuator handle; an actuator rod coupled to the actuator bar of the breaker actuator handle, and to a movable break contact of the circuit breaker, in order to operate it against a fixed breaker contact, on and off, by a rotational operation of the breaker actuator handle; and an overload actuator handle including a short overload actuator arm coupled to the overload actuator handle; and a link arm coupled to the overload actuator arm, in order to operate it, on and off, by a rotational operation of the overload actuator handle.

6 Claims, 2 Drawing Sheets

MOUNTING SYSTEM FOR A CIRCUIT BREAKER

BACKGROUND OF THE INVENTION

A. Field of the Invention

The present invention refers to a circuit breaker and, more specifically to a simplified mounting system for a circuit breaker of the type used in transformers.

B. Description of the Related Art

Thermal or thermo-magnetic circuit breakers, including an overload unit, such as those existing in the commerce, are well known in the art for many purposes.

Said circuit breakers including a circuit breaker body including the breaking components and having a fixed break contact and a movable break contact mounted in a hinged fashion on the circuit breaker body, which is to be mechanically operated by a mounting system.

For distribution transformers, an specific mounting system for such circuit breaker was developed by the inventor of the present invention, which is now in commerce.

Said now known mounting system was constituted by a mounting plate including retained at mounting wall of a mounting box, including a five pieces support bench presenting a first mounting surface substantially parallel to the mounting plate, and an angular extension having a second mounting surface, in order to retain the circuit breaker body at an angle of about 15° regarding the mounting plate.

Because of the position of the circuit breaker provided by the above mounting system, an elongated actuator rod and an elongated cutter pin are needed to operate the movable contact breaker against the fixed contact breaker of the breaker circuit, on and off, by a rotational operation of an actuator handle. This causes that the elongated winding connection of the circuit breaker had to pass over the movable elongated cutter pin, interfering with the operation thereof, causing in turn a continuous friction of the winding connection which, shortly, may cause short circuits and undesired failures in the transformers.

Furthermore, because of the necessary dimensions of the components of said mounting system, the dimensions of the transformers and of the volume of the oil contained in said transformers result increased, rebounding in the cost the transformer units.

Looking for a mounting system which place the breaker circuit in such a way that the movable components do not interfere nor scratch the low voltage leads connection to bushings, avoiding failures in the transformer units, as well as seeking for a reduction of the dimensions of the components in order to save costs in materials (steel and oil) in the transformer units, applicant conceived a new mounting system for said circuit breakers mainly for distribution transformers.

This new mounting system mainly comprising an angular mounting plate, including a planar portion to be retained to the mounting wall of a mounting box, and an angular portion at about 200° in which a circuit breaker body is retained substantially in an horizontal position, which allows to shortening both the actuator rod of the mechanical breaker actuator handle and the actuator rod of the movable breaker contact of the circuit breaker, connected thereto, so that the winding connection of the circuit breaker passes over no movable components (actuator rod of the movable contact) which might scratch it, and allowing in this way, to reduce the dimensions of the mounting breaker, as well as the transformer, saving materials such as steel and oil in said transformers.

SUMMARY OF THE INVENTION

It is therefore a main object of the invention, to provide a mounting system for a circuit breaker, having shorter and lesser number of components than the actually known mounting system.

It is another main object of the invention, to provide a mounting system for a circuit breaker, of the above-disclosed nature, including components, which do not interfere with the operation of the circuit breaker.

It is yet a main object of the invention, a mounting system for a circuit breaker, of the above disclosed nature, which has, among others, the following advantages:

Less pieces in the mounting plate;

A mounting plate of a very simple manufacturing because consists in a single plate including an angular portion at about 110°, on which the circuit breaker is mounted;

Allows to reduce the height of the position of the circuit breaker, allowing material savings in the transformers;

Allows to reduce the horizontal length, allowing in turn to reduce the diameter of the tank of the transformers, thus reducing requirements in materials (steel and oil of the transformers);

By placing the circuit breaker substantially horizontal, interference an components of the mounting system and the operation of the circuit breaker as well as scratching of the winding contact is avoided;

Allows that the circuit breaker be raised to the height of the low tension bushings, which in turn allows to reduce the height of the tank of the transformer saving materials.

These and other objects and advantages of the mounting system of the present invention will be apparent from the following description of the specific embodiments of the invention, provided in connection with the enclosed drawings.

Figure 1:
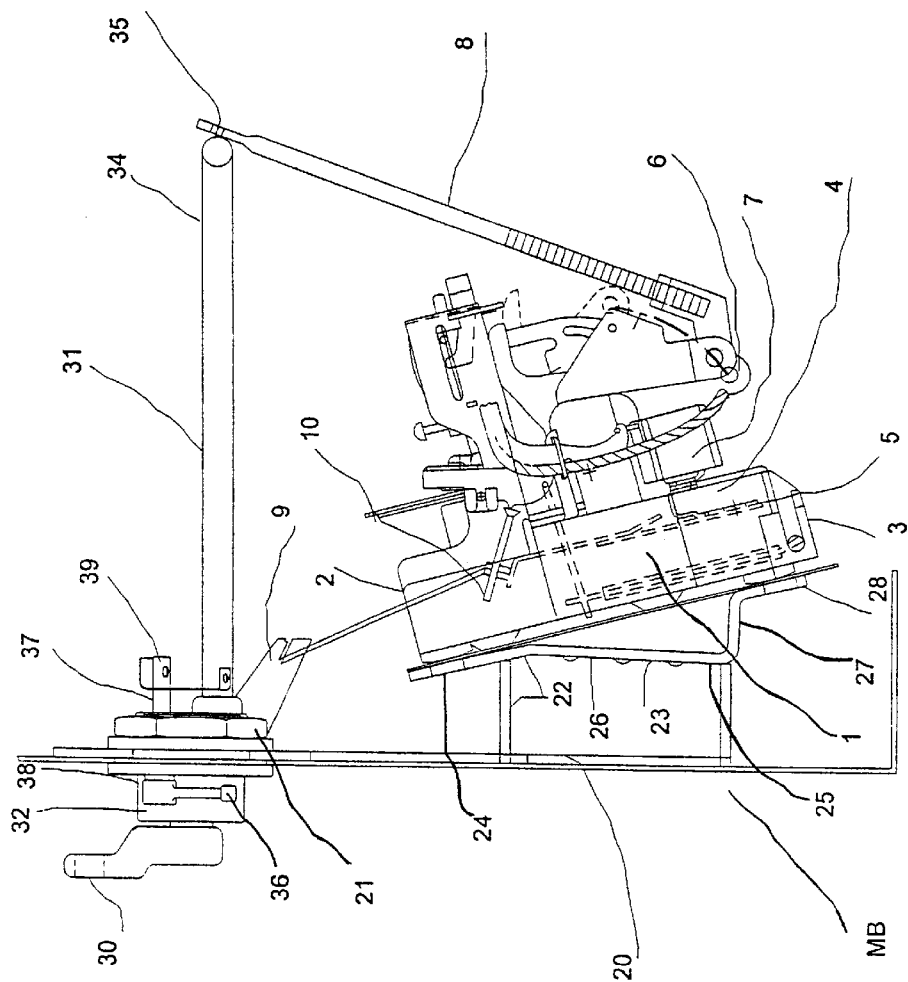
FIG. 1 is a lateral elevation view of a circuit breaker mounted in accordance with the known mounting system actually used for DISTRIBUTION transformers.

DETAILED DESCRIPTION OF THE SPECIFIC EMBODIMENTS OF THE INVENTION.

The invention will now be described in the following by firstly describing a circuit breaker in a very general way, as a starting reference and which is not the object of the present invention, then a known mounting system designed for transformers and afterwards the mounting system for circuit breakers in accordance with the present invention.

Commercial circuit breakers, including an overload unit, such as those produced and existing in the commerce by ERMCO, are well known in the art for many purposes, and comprising: a circuit breaker body 1 including internal breaking components (not illustrated), an upper end 2 and a lower end 3, a winding elongated connection 4 and a low tension elongated connection 5, a fixed break contact 6 and a movable break contact 7, by means of which the circuit breaker is operated on and off, mounted in a hinged fashion on the circuit breaker body 1, having an actuator rod 8, and an overload actuator 9, connected to an actuator pin 10.

Said movable break contact 7 and the overload actuator 9 are the components which are to be mechanically operated by the mounting system.

The known mounting system for a circuit breaker to be mounted on a mounting box MB comprising a mounting wall 11 having an internal face 12, consisting of:

a mounting plate 20, fixedly retained to the internal face 12 of the mounting wall 11, by means of an annular nut and screw assembly 21; said mounting plate 20 including a five pieces support bench 22 presenting a mounting surface 23 substantially parallel to the mounting plate 12, having an upper end 24 and a lower end 25, in order to retain the upper end 2 of the circuit breaker body 1, by means of a first nut and screw assembly 26, and an angular extension 27, having a mounting surface 28, in order to retain the lower end 3 of the circuit breaker body 1, at an angle of about 15° regarding the mounting plate 20;

a mechanical breaker actuator handle 30, including an elongated actuator rod 31 having a first end 32 coupled to the actuator handle 30, and a second and 34, passing through the annular nut and screw assembly 21, coupled to the actuator rod 8 of the movable break contact 7, by means of a cutter pin 35, in order to operate the breaker against the fixed contact breaker 6, on and off, by a rotational operation of the actuator handle 30; and an overload actuator handle 36 including a short overload actuator arm 37 having a first end 38 coupled to the actuator handle 36, and a second end 39 passing through the annular nut and screw assembly 21, coupled to the overload actuator 9, by the cutter pin 10, in order to operate it on and off by a rotational operation of the overload actuator handle 36.

Figure 2:
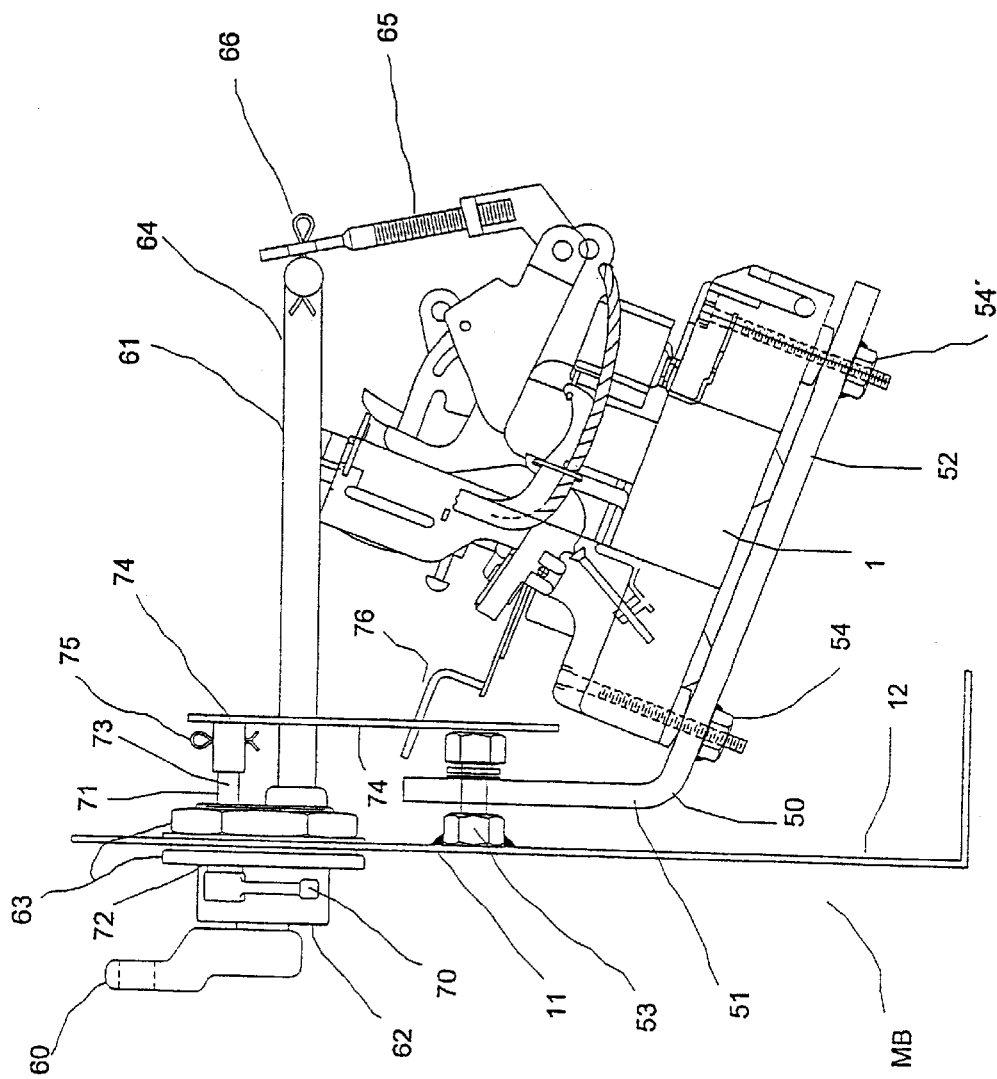
FIG. 2 is a lateral elevation view of the circuit breaker, mounted on the mounting system of the present invention.

Unlikely, the mounting system for a circuit breaker, according to preferred embodiment of the present invention illustrated in FIG. 2 comprising:

an angular mounting plate 50, including a planar portion 51 fixedly retained to the internal face 12 of the mounting wall 11 of the mounting box MB, by means of an annular nut and screw assembly 53, having an integral angular portion 52 at about 200° in which the circuit breaker body 1 is retained by means of a first and second nut and screw assemblies 54, 54' to retain it at an angle substantially perpendicular to regarding the planar portion 51 of the mounting plate 20 and to the internal face 12 of the mounting wall of the mounting box 10;

a mechanical breaker actuator handle 60, including an elongated actuator bar 61 having a first end 62 coupled to the actuator handle 60, and passing through an annular nut and screw assembly 63, and a second end 64, couple to an actuator rod 65 of the movable break contact 7 of the circuit breaker body 1, by means of a cutter pin 66, in order to operate the breaker against the fixed contact breaker 6, on and off, by a rotational operation of the actuator handle 60; and an overload actuator handle 70 including a short overload actuator arm 71 having a first end 72 coupled to the actuator handle 70, and a second end 73 passing through the annular nut and screw assembly 63; a link arm 74 coupled to the second end 73 of the overload actuator arm 71 by means of a pin 75, in order to operate an overload actuator 76, on and off, by a rotational operation of the overload actuator handle 70.

It should be understood that the above description of the specific and preferred embodiments of the mounting system of the present invention, is provided only as a way of illustration, but not as a limitation thereof, and therefore the scope of the invention is only established by the enclosed claims.

What is claimed is:

1. A mounting system for a circuit breaker of the type comprising a circuit breaker body including internal breaking components, a winding elongated connection and a low tension elongated connection, a fixed break contact and a movable break contact, mounted in a hinged fashion on the circuit breaker body, having an actuator rod, and an overload actuator having an actuator pin; said mounting system comprising:

a mounting box comprising a mounting wall having an internal face;

an angular mounting plate, including a planar portion retained to the internal face of the mounting wall of the mounting box, and an angular portion at about 200° in which the circuit breaker body is retained at an angle substantially perpendicular to regarding the planar portion of the mounting plate and to the internal face of the mounting wall of the mounting box;

a mechanical breaker actuator handle, retained to the mounting wall of the mounting box, including a short actuator bar having a first end coupled to the mechanical breaker actuator handle, and a second end passing through the mounting wall of the mounting box;

a short actuator rod having a first end coupled to the second end of the actuator bar of the mechanical breaker actuator handle, and a second end coupled to a movable break contact of the circuit breaker, in order to operate the movable breaker contact against a fixed breaker contact, on and off, by a rotational operation of the mechanical breaker actuator handle; and a short overload actuator handle including a short overload actuate bar having a first end coupled to the overload actuator handle, and a second end passing through the mounting wall of the mounting box; and a link arm coupled to the second end of the overload actuator bar, in order to operate an overload actuator, on and off, by a rotational operation of the overload actuator handle.

2. The mounting system as claimed in claim 1, wherein the planar portion of the angular mounting plate is retained to the internal face of the mounting wall of the mounting box, by means of a first nut and screw assembly.

3. The mounting system as claimed in claim 1, wherein the circuit breaker body is retained to the integral angular portion by means of a second and third nut and screw assemblies.

4. The mounting system as claimed in claim 1, wherein the mechanical breaker actuator handle, is retained to the mounting wall of the mounting box, by means of an annular nut and screw assembly.

5. The mounting system as claimed in claim 1, wherein the second end of the short actuator bar of the mechanical breaker actuator handle is coupled to the actuator rod of the movable break contact of the circuit breaker, by means of a cutter pin.

6. The mounting system as claimed in claim 1, wherein the link arm is coupled to the second end of the overload actuator arm by means of a pin.

* * * * *